United States Patent

[11] 3,595,340

[72] Inventors Ronald F. Obergefell
 Richmond Heights;
 Edward E. Kish, Cleveland Heights, both of, Ohio
[21] Appl. No. 837,763
[22] Filed June 30, 1969
[45] Patented July 27, 1971
[73] Assignee Houdaille Industries, Inc.
 Buffalo, N.Y.

[54] LUBRICATION PUMP
 2 Claims, 5 Drawing Figs.
[52] U.S. Cl. .................................................. 184/27,
 184/28, 222/334
[51] Int. Cl. ....................................................... F16n 13/04
[50] Field of Search ........................................... 184/28, 29,
 34, 42, 76, 32, 26, 33, 7, 7 C; 222/261, 262, 263, 334

[56] References Cited
UNITED STATES PATENTS

| | | | |
|---|---|---|---|
| 2,387,684 | 10/1945 | Rotter .......................... | 184/28 |
| 2,432,969 | 12/1947 | LeClair ........................ | 184/28 |
| 2,440,411 | 4/1948 | Leonard ...................... | 184/28 |
| 2,719,603 | 10/1955 | LeClair ........................ | 184/29 X |
| 2,817,417 | 12/1957 | Cunningham et al. ........ | 184/27 |
| 2,995,212 | 8/1961 | Dinkelkamp ................. | 184/28 |
| 3,115,282 | 12/1963 | McKenzie .................... | 222/334 X |

Primary Examiner—Manuel A. Antonakas
Attorney—Hill, Sherman, Meroni, Gross and Simpson ABSTRACT: A lubricant pump assembly comprising a pump body and a lubricant reservoir mounted on the body. The pump body is of cast one-piece construction and is arranged to interchangeably accommodate adapters enabling the pump assembly to be operated either manually, pneumatically, hydraulically or by virtue of a motor drive.

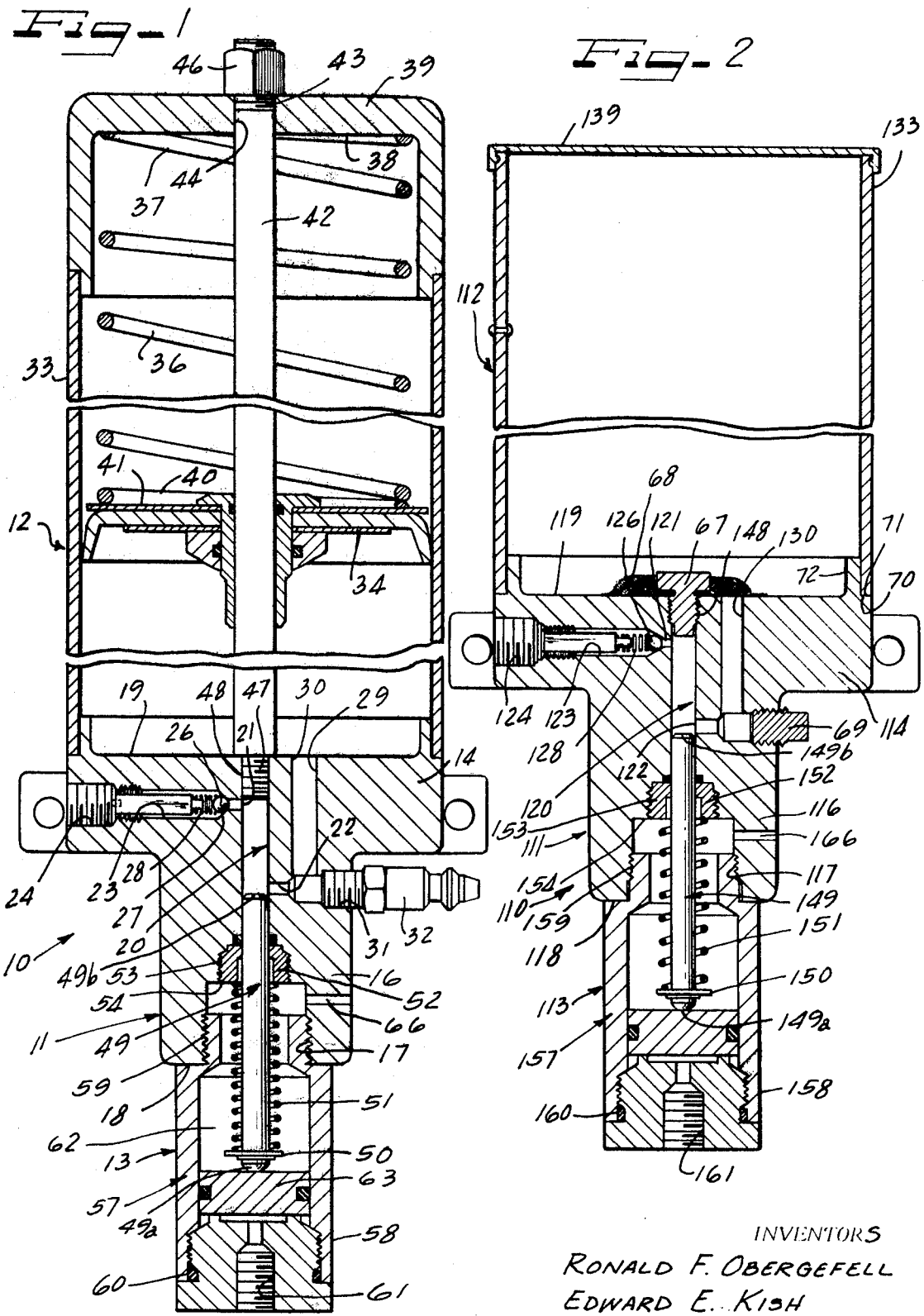

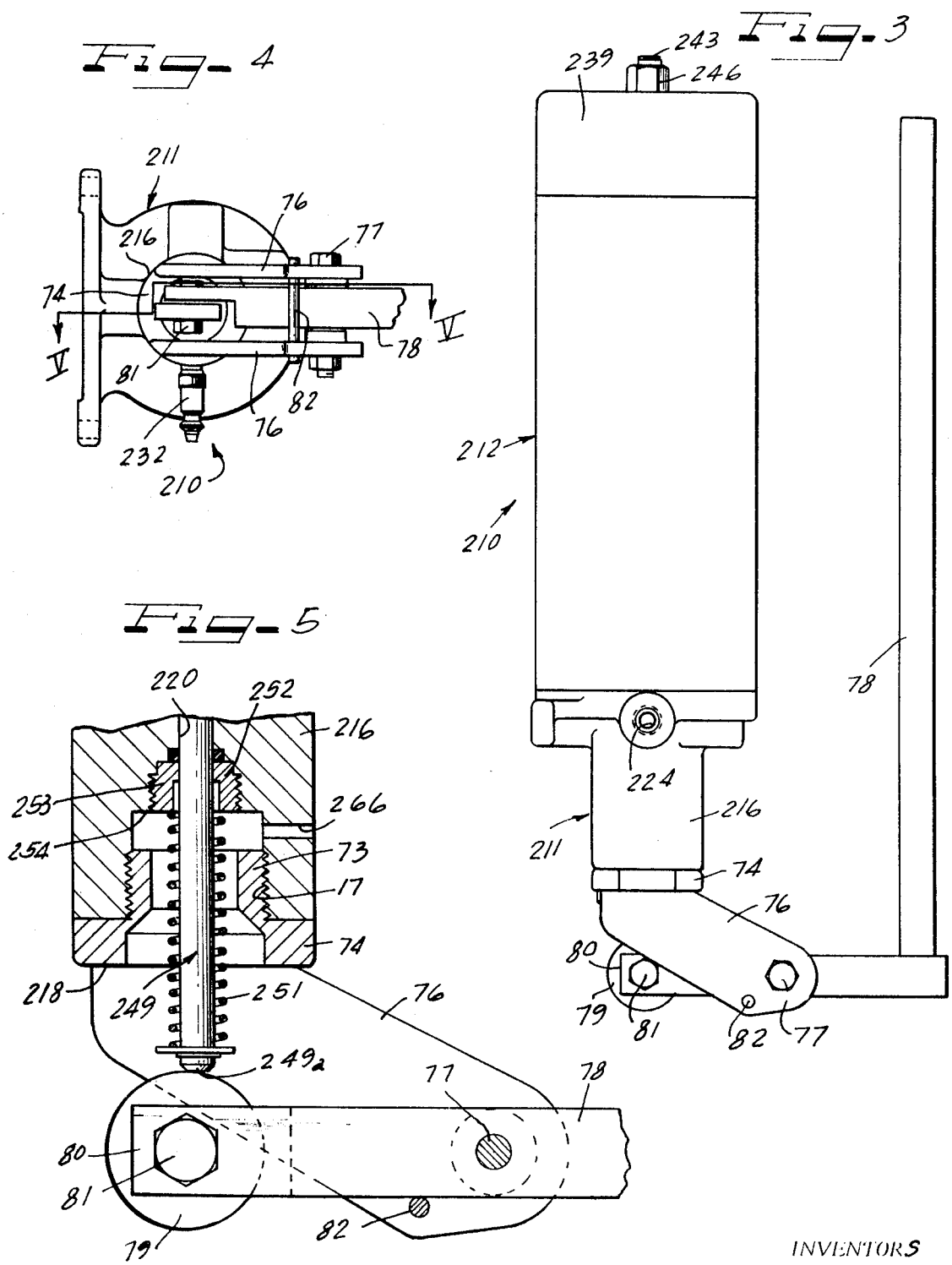

3,595,340

LUBRICATION PUMP

BACKGROUND OF THE INVENTION

This invention relates generally to the field of lubrication equipment and more particularly to lubricant pumps for delivering lubricant under pressure to selected points of use such as bearings or the like.

Lubricant pumps with which the present invention is most closely related include a pump body and a lubricant reservoir mounted on the body. A lubricant outlet is formed in the body and adapted for connection to the selected point of use and a piston-cylinder arrangement is disposed within the body and in communication with the reservoir and the lubricant outlet for drawing charges of lubricant from the body and discharging same from the lubricant outlet.

In some lubricant pumps of this general description the lubricant pumping piston is manually actuated by means, for example, of a lever pivotally mounted on the body and operatively connected to the piston for reciprocal movement thereof. In other known pumps the lubricant pumping piston is pneumatically actuated while in others the piston is either hydraulically actuated or motor driven or otherwise powered or actuated.

As a result of the relatively high number of parts of which the pump bodies of prior lubricant pump assemblies of this general description consist the cost of manufacture thereof has been relatively high, rendering the use thereof such pumps in many applications infeasible. Furthermore many such known lubricant pump assemblies are constructed for either manual or pneumatic actuation and are not interchangeable in this respect.

Of the known lubricant pump assemblies of this general description of which we are aware none is designed and constructed to sufficiently reduce manufacturing costs to a level at which the utilization thereof is feasible in all lubrication systems, regardless of how small and uncomplicated they may be. Thus many lubrication systems employ less preferable devices for pumping the lubricant. Even in applications which utilize lubricant pumping assemblies of this general description, however, the cost of the pumping assembly viz-a-viz the total cost of the lubrication system may be inordinately high.

SUMMARY OF THE INVENTION

In light of the foregoing it is an object of the present invention to provide a lubricant pump assembly as generally described hereinabove which is less expensive to manufacture and which is adapted to accommodate either manual or pneumatic actuation or operation.

To this end the pump assembly of the present invention comprises a cast one-piece pump body construction. Such construction is made practical by virtue of the novel arrangement of the lubricant passages and the like formed in the pump body.

In addition, the pump body is so constructed and arranged to accommodate various actuation means. To this end the pump body is provided with an oversized bore in which one end of the pumping piston resides and which is threaded to receive various externally threaded adapters, arranged respectively for different modes of operation. For example, the same one-piece cast pump body is conveniently utilized in pump assemblies adapted for either manual, pneumatic or hydraulic operation.

Another object of the invention is to utilize the same lubricant pumping assembly regardless of whether the lubricant being used is oil or grease. Though certain components are added depending upon the type of lubricant, the basic pump assembly including the one-piece cast pump body is identical.

The pump body of this invention reduces manufacturing costs and minimizes machining operations. Thus not only is the entire lubricant pump assembly of this invention more economical in manufacture (and thus susceptible of wider use) and adapted to accommodate different operation or actuation means but requires less time for assembly and disassembly and is more easily maintained.

Many other objects, features and advantages of the present invention will be readily apparent from the following description of preferred embodiments thereof, taken in conjunction with the accompanying drawing, although variations and modifications may be effected without departing from the spirit and scope of the novel concepts of this disclosure.

BRIEF DESCRIPTION OF THE DRAWING

FIG. 1 is a longitudinal cross-sectional view of a lubricant pump assembly constructed in accordance with the principles of the present invention and adapted for use with more viscous lubricants such as grease and further adapted for pneumatic operation.

FIG. 2 is a cross-sectional view of a pump assembly utilizing the same pump body as that shown in FIG. 1 but adapted for use with lighter lubricant such as oil.

FIG. 3 is an elevational view of a lubricant pump assembly as shown in FIG. 1 adapted for manual operation.

FIG. 4 is a fragmentary elevational end view of the lubricant pump assembly shown in FIG. 3.

FIG. 5 is an enlarged fragmentary cross-sectional view of the lower end of the pump assembly shown in FIG. 3.

DESCRIPTION OF THE PREFERRED EMBODIMENTS

As noted, the embodiment of the present invention illustrated in FIG. 1 is specially adapted for pneumatic operation using more viscous lubricants such as grease. The entire assembly is indicated generally at reference numeral 10 and may be more particularly characterized as comprising a pump body 11 to which is affixed a lubricant reservoir 12. An adapter 13 is mounted on the pump body 11 to adapt the assembly 10 for pneumatic operation.

The pump body 11 is of one-piece cast construction. This not only reduces manufacturing expenses but as a consequence of the reduced number of passages, ports and the like formed therein, the cost and number of machining operations is also reduced.

The pump body 11 comprises a generally enlarged portion 14 and a cylindrically shaped reduced diameter portion 16 extending therefrom. A threaded cylinder or chamber 17 is formed in the reduced diameter portion 16 and opens to an end wall 18 of the body 11. An opposite end wall 19 faces the interior of the reservoir 12.

From within the pump body 11 is a pumping cylinder 20 disposed in axial alignment with the cylinder or chamber 17. Formed in the wall of the cylinder 20 are a pair of ports 21 and 22 spaced axially from one another and in communication with one another through the pumping cylinder 20. Port 21 communicates with a lubricant outlet passage 23 terminating at a lubricant outlet 24 formed in the pump body 11 and adapted for connection to a selected point of use such as a bearing or the like. A ball check 26 is disposed within the passage 23 for seating engagement with a valve seat 27 and is biased against the valve seat by virtue of a coil spring 28 bottomed thereon.

The cylinder port 22 is in communication with a lubricant fill passage 29 which terminates at a port 30 formed in the end wall 19 of the pump body 11 and communicating directly with the interior of the reservoir 12. A lubricant inlet 31 also communicates with the fill passage 29 and, in the embodiment shown in FIG. 1, is adapted to receive a grease fitting 32 for charging the reservoir 12 with lubricant.

The lubricant stored within an enclosure wall 33 of the reservoir 12 is continuously subjected to a force which tends to urge the heavy lubricant toward the end wall 19 of the pump body 11 and more particularly port 30 formed therein. This force is generated by a grease follower cup 34 disposed within the reservoir 12 and biased in the direction of the pump body end wall 19 by virtue of a coil spring 36. One end 37 of the spring 36 bottoms on an inner wall 38 of a reservoir cap 39 whilst an opposite end 40 bottoms on a top wall 41 of the follower cap 34. The cap 34 is guided in rectilinear movement within the reservoir 12 by an elongated rod 42 which projects at one end 43 through an aperture 44 formed in the cap 39 and which is threaded to receive a complementary threaded nut 46. An opposite end 47 of the rod 42 is threaded into an end 48 of the pumping cylinder 23.

Slidably carried in the pumping cylinder 20 is a lubricant pumping piston indicated generally at reference numeral 49 which projects into the chamber 17 and outwardly beyond the outer or outboard end 18 of the pump body 11. Mounted fast on an outer end 49a of the piston 49 is a washer 50 for bottoming one end of a coil spring 51 wound about the piston 49, the other end of which is bottomed on a seal plug 52 threaded into a bore 53 formed in an inner wall 54 of the chamber 17.

Spring 51 biases the piston 49 downwardly (as viewed in FIG. 1) to a position at which an inner end 49b thereof opens the port 22 formed in the pumping cylinder 20. The pressure to which the grease in the reservoir 12 is subjected by virtue of the spring biased follower cup 34 then forces a charge of grease into the open portion of the pumping cylinder 20 between the end 49b of the pumping piston 49 and the threaded end 47 of the rod 42. The piston 49 is then pushed inwardly (or upwardly as viewed in FIG. 1) either manually or pneumatically to cover port 22 and deliver the charge of grease within the pumping cylinder 20 through port 21, past the ball check 26, through the passage 23 and then through the lubricant outlet 24 to the point of use connected thereto.

The embodiment of the invention illustrated in FIG. 1 is specially adapted for pneumatic actuation of the pump piston 49 and to that end includes an adapter indicated generally at reference numeral 57 comprising a hollow tubular coupling 58 having a reduced diameter portion 59 openly communicating with the chamber 17 and externally threaded to be received by the internal threads of the chamber wall 17. An outer end 60 of the coupling 58 has a threaded bore or air inlet opening 61 formed therein for connection to a source of pressurized air.

Disposed within a chamber 62 formed in the coupling 58 is an air-operated actuating piston 63 adapted for abutting and pushing engagement with the outer end 49a of the pumping piston 49. Valve means or the like may be mounted in the conduit connected to the air inlet opening 61 for controlling the flow of pressurized air to the actuating piston 63 and thus the movement of the lubricant of the pumping piston 49 against the bias of the coil spring 51, causing a charge of lubricant to be delivered from the lubricant outlet 24. A bleed passage 66 communicates the chamber 62 with atmospheric air to prevent a buildup pressure therewithin.

After the valve is closed to disconnect the pressurized air from the opening 61 and dump the high pressure air in the chamber 62 the coil spring 51 biases the lubricant pumping piston 49 as well as the actuating piston 63 downwardly to the positions thereof shown in FIG. 1, thus once again causing the pumping piston 49 to open the port 22 to enable the pumping cylinder 20 to gain receive a charge of lubricant from the reservoir 12.

The embodiment shown in FIG. 2 is specially adapted for less viscous lubricants such as oil. The reference numerals used in describing this embodiment will be similar to those used in the description of the embodiment of FIG. 1 but increased by the number 100.

Thus the reservoir 112 shown in FIG. 2 is similar to reservoir 12 shown in FIG. 1 except that the end cap 139 thereof is of lighter construction than end cap 31 since it does not bear the force of the heavy coil spring 36. The lighter oil in reservoir 112, of course, merely feeds into the pump body 111 by virtue of gravity flow.

The rod 42 is omitted in the FIG. 2 embodiment and into the threaded end 148 of the pumping cylinder 120 is threaded a plug 67 which mounts a fine screen filter 68 on the end wall 119 of the pump body 111 and more particularly over the port 130 formed in the end wall 119.

The grease fitting 32 of FIG. 1 has been removed from the threaded opening 31 and in its place is a solid plug 69 the function of which is merely to seal off opening 31.

In all other respects the embodiment shown in FIG. 2 is similar to that shown in FIG. 1. The sidewall 133 of the reservoir 112 may be constructed of transparent material such as clear plastic so the level of lubricant in the reservoir may be easily ascertained. The lower end 70 of the side wall 133 is bottomed on a shoulder 71 formed on the end wall 119 and surrounding a vertically upstanding annularly shaped flange 72 extending from the end wall 19. The abutting surfaces of the sidewall 133, the shoulder 71 and the flange 72 are bonded together by means of epoxy or similar fastening material. Of course, the side wall 33 of the reservoir 12 may be constructed of the same transparent material and may be joined to the pump body 11 in the same manner.

It will be appreciated that the embodiment of the invention shown in FIG. 1 and 2 may be hydraulically actuated or operated by any pressurized fluid available for such purpose.

The embodiment shown in FIGS. 3—5, in which parts similar to those shown in FIG. 1 are identified by similar reference numerals increased by the number 200, is specially adapted for manual actuation but utilizes the same one-piece cast pump body as that included in the embodiment of FIG. 1.

As illustrated in FIG. 3 a reservoir 212 is mounted on the pump body 211. The adapter 57 shown in FIG. 1 has been removed and in place thereof in the threaded portion of chamber 17 is an externally threaded sleeve 73 extending from a mounting bracket 74.

Projecting from the bracket 74 are a pair of spaced parallel flanges 76, 76. The flanges 76 are apertured to receive a lever-mounting shaft such as a threaded bolt as indicated at reference numeral 77 on which is pivotally mounted a manually actuated lever arm 78. A disc-shaped piston actuator 79 is rotatably mounted on one end 80 of the lever 78 by virtue of a bolt or the like 81.

The disc-shaped piston actuator 79 abuttingly engages the lower end 264 of the pump piston 216 and as the lever 78 is pivoted back and forth about the shaft 77 the actuator 79 and coil spring 251 operate to reciprocate the pumping piston 216. A stop in the form of a pin 82 maintains the actuator 79 in abutting engagement with the piston 216.

It will be appreciated that the embodiment of the invention shown in FIGS. 3—5 may also be motor driven as, for example, by providing a motor-driven cam or the like arrangement for actuating lever arm 78. Other power sources may also be conveniently utilized, as will be understood by those skilled in the art.

By virtue of the present invention the same pump body of one-piece cast construction is utilized regardless of whether the pump assembly is adapted to supply oil or grease in the lubrication system and regardless of the pump actuation means employed. The one-piece cast construction of the pump body and the arrangement of the flow passages, threaded connections and the like formed therein substantially reduce the cost of manufacture of the pump block and thus the entire pump assembly. Furthermore inventory requirements are substantially reduced since the same pump block is utilized for oil and grease applications whether operated manually, pneumatically, hydraulically, or otherwise.

What we claim is:

1. A manually and pneumatically operable lubrication pump assembly comprising
   means forming an open-bottomed lubricant reservoir,
   means forming a pump body of one-piece cast construction having an inner end affixed to the bottom end of said reservoir,
   an outer end spaced from said reservoir and a lubricant outlet formed therein,
   means forming a lubricant pumping cylinder in said pump body opening to said outer end thereof,
   means forming first and second axially spaced ports in said pumping cylinder, means forming a lubricant outlet passage in said pump body communicating said first port and said lubricant outlet, means forming a lubricant fill passage in said body communicating said second port and said reservoir, lubricant piston means including a pumping piston slidably carried in said pumping cylinder and extending beyond the outer end thereof, the inner end of said piston being movable from a first position outboard of said second port to a second position adjacent said first port for enabling lubricant to enter said pumping cylinder through said fill passage and for pumping same out said lubricant outlet, spring means interconnecting said pump body and said piston means for biasing said piston means toward said first position, a cylindrical threaded opening formed in said outer end of said pump body through which the outer end of said piston extends, adapter means for providing pneumatic pumping piston actuating means comprising an elongated tubular coupling having a cylindrical chamber therein, an externally threaded inner end communicating with said chamber for threading into said threaded opening of said pump body in surrounding relation to said pumping piston, an internally threaded outer end communicating with said chamber for connection to a source of pressurized air and an air-operated actuating piston disposed in said chamber for engaging the outer end of said pumping piston and for moving same toward said second position thereof against the bias of said spring means, said pumping piston extending through said inner end of said coupling and the outer end of said pumping piston residing within said chamber.

2. The invention as defined in claim 1 and including manual pumping piston actuating means for use alternatively in lieu of said pneumatic pumping piston actuating means and comprising a mounting bracket, an externally threaded sleeve for threading into said threaded opening of said pump body, said bracket and said sleeve being apertured for receiving said pumping piston so that the outer end of said piston extends therebeyond, and means including a lever arm pivotally mounted on said bracket for engaging and activating said pumping piston.